United States Patent
Keller et al.

(10) Patent No.: US 11,787,424 B2
(45) Date of Patent: Oct. 17, 2023

(54) METHOD FOR CHECKING AT LEAST ONE DRIVING ENVIRONMENT SENSOR OF A VEHICLE

(71) Applicants: Daimler AG, Stuttgart (DE); Robert Bosch GmbH, Stuttgart (DE)

(72) Inventors: Christoph Gustav Keller, Stuttgart (DE); Holger Mielenz, Ostfildern (DE)

(73) Assignee: Daimler AG, Stuttgart (DE)

( * ) Notice: Subject to any disclaimer, the term of this patent is extended or adjusted under 35 U.S.C. 154(b) by 218 days.

(21) Appl. No.: 17/290,370

(22) PCT Filed: Sep. 26, 2019

(86) PCT No.: PCT/EP2019/076053
§ 371 (c)(1),
(2) Date: Apr. 30, 2021

(87) PCT Pub. No.: WO2020/088857
PCT Pub. Date: May 7, 2020

(65) Prior Publication Data
US 2021/0403012 A1    Dec. 30, 2021

(30) Foreign Application Priority Data
Oct. 30, 2018  (DE) .................. 10 2018 127 059.3

(51) Int. Cl.
*B60W 50/02*  (2012.01)
*G06V 20/56*  (2022.01)
(Continued)

(52) U.S. Cl.
CPC ........ *B60W 50/0205* (2013.01); *B60W 50/14* (2013.01); *G06F 18/24* (2023.01);
(Continued)

(58) Field of Classification Search
CPC ... B60W 2050/0215; B60W 2050/143; B60W 2554/20; B60W 2554/4048;
(Continued)

(56) References Cited

U.S. PATENT DOCUMENTS 8,630,806 B1 * 1/2014 Zhu .................... G01C 21/26
  701/523
9,221,396 B1   12/2015 Zhu et al.
(Continued)

FOREIGN PATENT DOCUMENTS

DE    102004010197 A1   9/2005
DE    10313002 B4       3/2006
(Continued)

OTHER PUBLICATIONS

European Patent Office, International Search Report and Written Opinion in application No. PCT/EP2019/076053, dated Dec. 12, 2019, 17 pages, Rijswijk Netherlands.
(Continued)

*Primary Examiner* — Babar Sarwar
(74) *Attorney, Agent, or Firm* — Marshall & Melhorn, LLC

(57) ABSTRACT

A method for checking at least one driving environment sensor of a vehicle is provided. The vehicle is located on a digital map, features of stored stationary objects in an environment of the vehicle, which are expected to be recognized by the driving environment sensor, are identified in the digital map and the environment of the vehicle is sensed using the driving environment sensor. A degradation of the driving environment sensor is deduced if the features to be recognized according to expectations are not recognized by the driving environment sensor or if features actually recognized by the driving environment sensor deviate strongly from the features to be recognized according to expectations.

7 Claims, 1 Drawing Sheet

(51) Int. Cl.
*B60W 50/14* (2020.01)
*G06F 18/24* (2023.01)

(52) U.S. Cl.
CPC ..... *G06V 20/56* (2022.01); *B60W 2050/0215* (2013.01); *B60W 2554/20* (2020.02); *B60W 2554/802* (2020.02); *B60W 2556/40* (2020.02)

(58) Field of Classification Search
CPC ....... B60W 2554/802; B60W 2556/40; B60W 2720/10; B60W 50/0205; B60W 50/14; B60W 60/00186; G01S 13/93; G01S 13/931; G01S 17/93; G01S 17/931; G01S 2007/4975; G01S 2013/9323; G01S 7/40; G01S 7/4039; G01S 7/4091; G01S 7/41; G01S 7/412; G01S 7/415; G01S 7/497; G06F 18/24; G06V 20/56
See application file for complete search history.

(56) References Cited

U.S. PATENT DOCUMENTS

| | | | |
|---|---|---|---|
| 9,274,525 B1 | 3/2016 | Ferguson et al. | |
| 11,327,501 B1* | 5/2022 | Ferguson | B60W 30/12 |
| 2013/0208121 A1* | 8/2013 | Wu | H04N 17/002 |
| | | | 348/149 |
| 2013/0218398 A1* | 8/2013 | Gandhi | G01S 13/931 |
| | | | 701/31.1 |
| 2013/0335553 A1* | 12/2013 | Heger | G06T 7/269 |
| | | | 348/118 |
| 2017/0371346 A1 | 12/2017 | Mei et al. | |
| 2018/0052222 A1* | 2/2018 | Zeisler | G01S 17/931 |
| 2019/0339361 A1* | 11/2019 | Fechner | G01S 13/931 |
| 2021/0046943 A1* | 2/2021 | Bybee | G06V 20/56 |
| 2021/0201464 A1* | 7/2021 | Tariq | G06T 7/0002 |

FOREIGN PATENT DOCUMENTS

| | | | |
|---|---|---|---|
| DE | 102013113096 A1 | 6/2014 | |
| DE | 102013206707 A1 | 10/2014 | |
| DE | 102014226020 A1 | 6/2016 | |
| DE | 102015208228 A1 | 11/2016 | |
| DE | 102017000753 A1 | 7/2017 | |
| DE | 102016201250 A1 | 8/2017 | |
| DE | 112016000274 T5 | 10/2017 | |
| DE | 102017003741 A1 * | 10/2018 | |
| DE | 102017003741 A1 | 10/2018 | |
| WO | WO-2020078899 A1 * | 4/2020 | ........ B60W 50/0205 |

OTHER PUBLICATIONS

German Patent Office, German Office Action in application No. DE 10 2018 127 059.3 dated Jul. 8, 2019, 6 pages. Munich Germany.

China National Intellectual Property Administration, Office Action in CN Application No. 201980072365.6, dated Jul. 17, 2023, 11 pages.

* cited by examiner

METHOD FOR CHECKING AT LEAST ONE DRIVING ENVIRONMENT SENSOR OF A VEHICLE

FIELD

The invention concerns a method for checking at least one environment detection sensor on a vehicle.

BACKGROUND

From the prior art, as disclosed in DE 10 2013 206 707 A1, a method for checking an environment detection system on a vehicle is known. The environment detection system comprises at least two different types of environment sensors. The sensing area of the first environment sensor type does not overlap with the sensing area of the second environment sensor type. Objects in the vehicle's environment are detected by the first environment sensor type and categorized as static and dynamic objects using the data from the first environment sensor type. The relative position of detected static objects with respect to the vehicle is determined. This position is compared to a position ascertained by the second environment sensor type. If there is deviation beyond a limit value, an error is identified. The relative position of detected static objects is updated as the vehicle's movement causes it to leave the sensing area of the first environment sensor type.

DE 103 13 002 B4 describes a vehicle environment detection unit. Environment information is gathered by at least one image sensor. The detected environment information is processed into image information by a computer unit and shown on a video display. The image information is also placed in a temporary storage cache. The last detected image is compared to the image information placed in the temporary storage cache using an image processing algorithm. If the last detected image deviates from the stored image information beyond permissible limits, the displayed video image is changed. Vehicle operation parameters are assigned to the vehicle environment detection unit so that it will conclude that deviation beyond permissible limits exists when, based on the operating parameters, the expected deviation of the image information between the times of the last detected image capture and of the stored image information does not correlate plausibly with the result of comparing these two pieces of image information.

SUMMARY

The invention is intended to provide a method that improves upon the prior art, for checking at least one environment detection sensor of a vehicle.

The invention's objective is achieved by a method for checking at least one environment detection sensor of a vehicle with the features in the claims.

Advantageous embodiments of the invention are the object of the subordinate claims.

In one method for checking at least one environment detection sensor of a vehicle, such as a radar sensor, lidar sensor, image detection sensor, in particular video sensor, or an ultrasound sensor, according to the invention the vehicle is located on a digital map, in particular wherein a position of the vehicle is determined and a corresponding position is determined on the digital map. Features of stationary objects in the vehicle's environment that are stored in the digital map are identified in that map, which are expected to be recognized by the environment detection sensor if it is working properly. The vehicle's environment is scanned by the environment detection sensor. It is deduced that the environment detection sensor has degraded if the features whose recognition is expected are not recognized by the environment detection sensor or if the features actually recognized by the environment detection sensor deviate significantly from the features whose recognition is expected. In other words, if the environment detection sensor recognizes features, the features whose recognition is expected are compared to the features actually recognized by the environment detection sensor. If the features whose recognition is expected agree with the features actually recognized by the environment detection sensor, or at least if there is not too much deviation between the features whose recognition is expected and the features actually recognized by the environment detection sensor, no degradation of the environment detection sensor is deduced. However, if the environment detection sensor does not recognize any features or if the features actually recognized by the environment detection sensor in this comparison do not agree with the features whose recognition is expected, with strong, and in particular too strong, deviation, degradation of the environment detection sensor is deduced. Strong deviation and in particular too strong deviation, occurs in particular when the deviation exceeds a preset tolerance range. In other words, if the features actually recognized by the environment detection sensor do not agree with the features whose recognition is expected, but the deviation between the features actually recognized by the environment detection sensor and the features whose recognition is expected is not too strong, and in particular lies within the preset tolerance range, no degradation of the environment detection sensor is recognized.

In one advantageous embodiment of the method, degradation of the environment detection sensor is deduced if an expected distance between the vehicle and one of the objects stored in the map varies from an actual detected distance by more than a preset distance threshold value. In this case, the distance between the vehicle and an object represents the feature to be considered for the object. The expected distance of an object is determined from the digital map as a feature of the object whose recognition is expected, and the actual distance is determined by the environment detection sensor as an actual recognized feature.

For example, if it is recognized that the contour of a certain object, such as a tree, at a given location has a known distance with a known spread, e.g., 50 m±0.15 m, but the actual measured distance is 45 m±1.2 m, for example, or the object isn't perceived at all, degradation of the environment detection sensor can be deduced.

In another advantageous embodiment of the method, objects detected by the environment detection sensor are classified based on sensor data from the environment detection sensor, and advantageously also with reference to sensor data from other sensors. When an object is classified, a classification type is recognized for the object. In this case, the classification type of an object represents the feature to be considered for that object. The recognized classification types of objects are tested for agreement with expected classification types, the features of those objects whose recognition is expected. Degradation of the environment detection sensor is deduced if a determined classification rate is lower than a preset classification threshold. The classification rate indicates how high the level of agreement is between the determined and expected classification types.

For example, degradation of the environment detection sensor is deduced if classification says that a detected object is a yield sign and the determined classification rate says that the probability of the object being a yield sign is less than 87%.

The invented method thereby makes it possible to determine degradation of the vehicle's at least one environment detection sensor. This method is especially advantageous for self-driving vehicles such as shuttles, robo-taxis, or other vehicles. If degradation of the at least one environment detection sensor is determined, so that there is a corresponding reduction in the efficiency of the at least one environment detection sensor or, for example, multiple, similar or differing environment detection sensors included in an environment detection sensing system on the vehicle, a corresponding reaction, in particular to avoid hazardous situations, can be initiated in a process performing automated or autonomous operation of the vehicle. For example, in particular when there is a reduction in the detection range of the at least one environment detection sensor due to the recognized degradation, the vehicle's speed can be decreased, i.e., the speed is adapted to the reduced detection range. This can affect, for example, the current speed and/or a maximum allowable speed for the vehicle. Alternatively, the vehicle is shut off when there is recognized degradation of the environment detection sensor, for example, is brought safely to a standstill on the shoulder of the road or next to the road, or in a parking space or parking lot or emergency pull-off area, or in another location out of traffic where the vehicle in particular represents no danger to other traffic, in particular in the case of a self-driving vehicle. If a vehicle driver is present in the vehicle, then alternatively or additionally the vehicle driver can be notified of the environment detection sensor's degradation, so that he can take over the vehicle driving, for example. No autonomous or automated vehicle operation is possible then, other than manual vehicle operation by a vehicle driver. For an automated or self-driving vehicle, in particular if no vehicle driver is present in the vehicle, alternatively or additionally, it is possible that a remote operator, i.e., in particular a person outside of the vehicle with remote access to the vehicle, in particular to the vehicle's steering or control equipment, can assess the determined degradation and resulting efficiency of the environment detection sensor and initiate additional steps, such as the steps described above, for example reduction of the vehicle's current and/or maxim/um allowable speed and/or shutting the vehicle off as described above.

The invented method thereby makes it possible to avoid potentially hazardous situations that could arise due to unrecognized efficiency reduction in the at least one environment detection sensor, such as hazardous situations due to failed or late detection of objects in the vehicle's environment. Using the invented method, the error event of degradation of the at least one environment detection sensor is recognized and an appropriate reaction can be initiated, such as driving more slowly or an emergency stop of the vehicle.

Advantageously, degradation of the environment detection sensor is not deduced if it is determined that the features whose recognition is expected are not recognized by the environment detection sensor due to being concealed by at least one dynamic object, or the features actually recognized by the environment detection sensor deviate significantly from the features whose recognition is expected due to being concealed by at least one dynamic object. This prevents erroneous degradation recognition due to the view being obscured by dynamic objects.

In one possible embodiment, features of stored stationary objects in the vehicle's environment, whose recognition by the environment detection sensor is expected, are identified in the digital map by means of sensor-specific detection information stored in the digital map. Alternatively or additionally, features of stored stationary objects in the vehicle's environment, whose recognition by the environment detection sensor is expected, are identified in the digital map by means of a calculation of the expected recognizability, in particular through at least one ray tracing method based on a three-dimensional model of the digital map. Ray tracing is an algorithm based on sending out rays for calculating concealment, i.e., for determining the visibility of three-dimensional objects outward from a particular point in space.

If the vehicle, or in particular an environment detection sensing system on the vehicle, has multiple, similar or differing environment detection sensors, for example, the method can be applied for one of the environment detection sensors, some of the environment detection sensors, or all environment detection sensors, simultaneously or sequentially, for example. The method can be applied in particular for an environment detection sensor or for those environment detection sensors by means of which features of the stationary objects in the vehicle's environment stored on the digital map can be recognized.

DESCRIPTION OF THE FIGURES

Examples of the invention are explained in more detail below, with reference to figures.

The figures show.

DESCRIPTION

Figure 1:
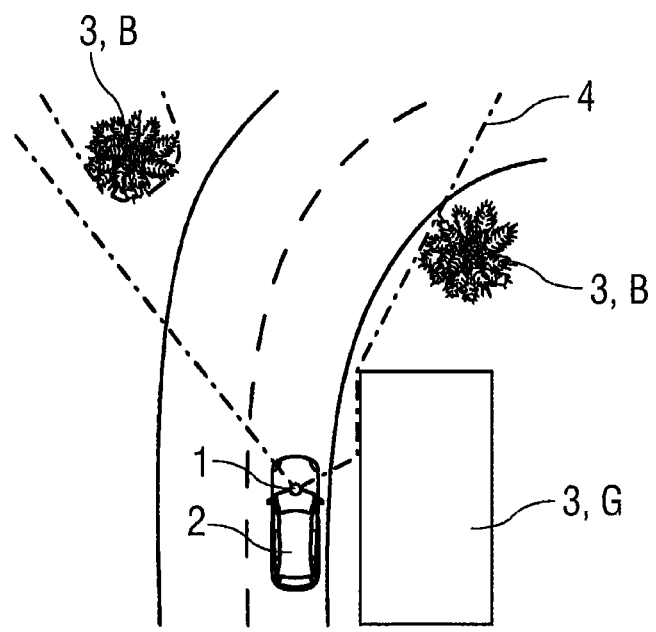
FIG. 1 a schematic example of environment detection by means of an environment detection sensor on a vehicle, and FIG. 2 another schematic example of environment detection by means of an environment detection sensor on a vehicle.

The same items are marked with the same references in all figures.

Based on FIGS. 1 and 2, which show examples of environment detection by means of an environment detection sensor 1 on a vehicle 2, a method for checking the at least one environment detection sensor 1 on the vehicle 2 is described below. In this method, the vehicle 2 is located on a digital map, in particular wherein a position of the vehicle 2 is determined and a corresponding position is determined on the digital map. Features of stationary objects 3 in the environment around the vehicle 2 stored in the digital map are identified on that map, which are expected to be recognized by the environment detection sensor 1 if it is working properly.

The environment around the vehicle 2 is scanned by the environment detection sensor 1. It is deduced that the environment detection sensor 1 has degraded if the features whose recognition is expected are not recognized by the environment detection sensor 1 or if the features actually recognized by the environment detection sensor 1 deviate significantly from the features whose recognition is expected.

In other words, if the environment detection sensor 1 recognizes features, the features whose recognition is expected are compared to the features actually recognized by the environment detection sensor 1. If the features whose recognition is expected agree with the features actually recognized by the environment detection sensor 1, or at least if there is not too much deviation between the features whose recognition is expected and the features actually recognized by the environment detection sensor 1, no degradation of the environment detection sensor 1 is deduced. However, if the environment detection sensor 1 does not recognize any features or if the features actually recognized by the environment detection sensor 1 in this comparison do not agree with the features whose recognition is expected, with strong, and in particular too strong, deviation, degradation of the environment detection sensor 1 is deduced.

Strong deviation, and in particular too strong deviation, occurs in particular when the deviation exceeds a preset tolerance range. In other words, if the features actually recognized by the environment detection sensor 1 do not agree with the features whose recognition is expected, but the deviation between the features actually recognized by the environment detection sensor 1 and the features whose recognition is expected is not too strong, and in particular lies within the preset tolerance range, no degradation of the environment detection sensor 1 is recognized. The threshold value for a tolerance measurement can be based on safety requirements, for example, so that the distance measurement value cannot exceed a preset error, for example, or the classification rate of a sensor in the sensor array cannot lie below a preset threshold.

The method makes it possible for a self-driving vehicle 2, such as a shuttle or robo-taxi, to determine whether an environment detection sensing system, including the at least one environment detection sensor 1 or multiple similar or different environment detection sensors 1, is experiencing a performance reduction, i.e., a reduction in its efficiency. In the event of a recognized performance reduction, an expanded system reaction by the vehicle 2 can be initiated to prevent hazardous situations.

Figure 2:
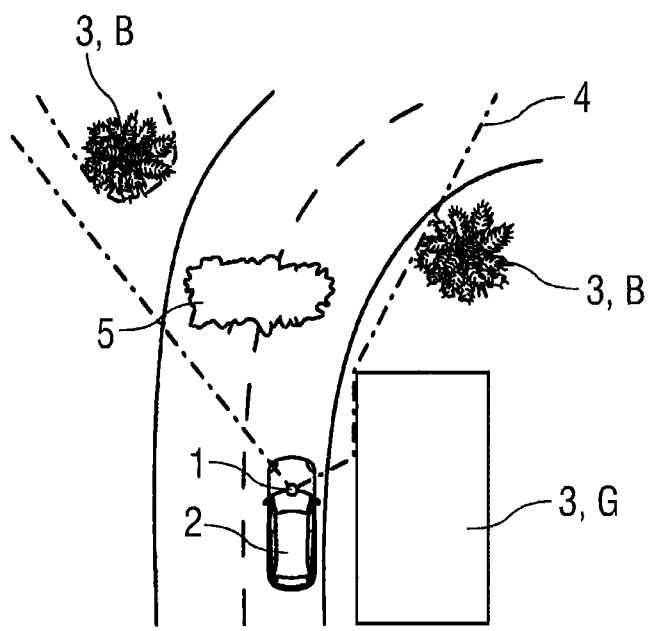

The core of the method consists of the fact that, for the sensor technologies available in the vehicle 2, i.e., for the respective environment detection sensor 1, which should be checked using the method, at each point in time it is known which infrastructure objects, i.e., stationary objects 3, for example buildings G and/or vegetation in the form of bushes B, for example, as shown in FIGS. 1 and 2, should be recognized in which locations. If one or more of the expected stationary objects 3, and in particular their features, cannot be determined by the respective environment detection sensor 1, and if it cannot be determined that this was caused by view concealment, in particular due to other dynamic objects, this is an indication of performance degradation, i.e., degradation of the respective environment detection sensor 1.

Such degradation can be caused, for example, by atmospheric factors, such as fog and/or rain and/or snow, and/or by mechanical factors. FIG. 2 shows an example of an atmospheric effect, i.e., an atmospheric impediment 5 of the environment detection sensor 1.

The method allows for referential identification of respective causes. Therefore, atmospheric factors systematically predominate in all affected environment detection sensors 1 of the technologies recommended for such atmospheric factors, while mechanical effects on an environment detection sensor 1 or several environment detection sensors 1 remain limited. In other words, a mechanical factor can be ruled out in particular if one or more environment detection sensors 1 on the vehicle 2 are experiencing degradation and one or more other environment detection sensors 1 on the vehicle 2, which are configured in the same way as the environment detection sensor 1 that is experiencing degradation and/or should also have been affected by atmospherically caused degradation, have no degradation.

Such a determination, whether the respective existing degradation is atmospherically or mechanically caused, can be advantageous because atmospherically caused degradation changes as the atmospheric conditions change, so that once atmospheric conditions improve there is no longer any degradation of the environment detection sensor 1. Mechanical degradation, caused by damage to the environment detection sensor 1 and/or to an area of the vehicle 2 on which it is installed, for example, does not improve by itself but rather requires repair or replacement or adjustment and/or calibration of the environment detection sensor 1.

In one possible embodiment of the method, features of stored stationary objects 3 in the environment around the vehicle 2, whose recognition by the environment detection sensor 1 is expected, are identified in the digital map by means of sensor-specific detection information stored in the digital map. The stationary objects 3 and their features are therefore sensor-specifically coded into the digital map, so that from the digital map it is possible to read directly which stationary objects 3 and their corresponding features the respective environment detection sensor 1 must recognize.

In another embodiment of the method, this does not happen, i.e., the digital map is not coded to indicate which environment detection sensor 1 should recognize the stationary object 3 and its features or which of the stationary objects 3 and their features recorded in the digital map should be recognized by the respective environment detection sensor 1 to be checked, but instead an expected visibility of a respective stationary object 3 and its features are actively calculated at each point in time for the respective sensor technology, i.e., for the respective environment detection sensor 1 to be checked, for example by one or more ray tracing methods based on a three-dimensional model of the digital map. Thus, in this embodiment of the method, features of stored stationary objects 3 in the environment around the vehicle 2, whose recognition by the environment detection sensor 1 is expected, are identified in the digital map by means of a calculation of the expected recognizability, in particular through at least one ray tracing method based on a three-dimensional model of the digital map.

If performance degradation, i.e., degradation of the respective checked environment detection sensor 1, is recognized, the system, i.e., the vehicle 2, and in particular a system for performing automatic operation of the vehicle 2, reacts, advantageously with an adequate process. Therefore, if there is a reduction in a view width, i.e., a detection range width, of the respective checked environment detection sensor 1, advantageously a maximum speed of the vehicle 2 is reduced. Alternatively or additionally, in the event of such an error, i.e., recognized degradation of the respective checked environment detection sensor 1, the vehicle 2 can also be actively shut off, for example. In this case, for example, the vehicle 2 automatically drives to a suitable position, such as a roadside, paved shoulder, emergency pull-off area, or parking lot, and is shut off there. The respective way to proceed, i.e., whether, in what fashion, at what speed, and how far the vehicle 2, in particular automated, can still go, depends especially on the degree of the determined degradation of the respective environment detection sensor 1 and on how many and which environment detection sensors 1 of the vehicle 2 are experiencing such degradation.

Alternatively or in addition to such an especially automated reaction of the vehicle 2 to the recognized degradation of the respective checked environment detection sensor 1, it is possible, for example, that a remote operator, i.e., a person who is not in the vehicle 2 or in the immediate vicinity of the vehicle 2 but instead has remote access to the vehicle 2, in particular to steering and/or control equipment of the vehicle 2, assesses the current sensor performance, i.e., efficiency, of the respective environment detection sensor 1 for which degradation was determined when it was checked and initiates appropriate additional steps, such as reducing the maximum speed of the vehicle 2, changing the driving route of the vehicle 2, and/or shuts off or initiates the shutoff of the vehicle 2, in particular in an appropriate location for such a shutoff.

The invented method thereby makes it possible to avoid potentially hazardous situations such as failed or late detection of dynamic objects and stationary objects 3 in the environment of the vehicle 2, due to unrecognized performance reduction in environment detection, i.e., due to unrecognized efficiency reduction in one or more environment detection sensors 1 of the vehicle 2. By means of the method, an error situation caused by degradation of one or more environment detection sensors 1 of the vehicle 2 can be recognized, and supported system reactions can thereby be initiated, such as slower driving to an emergency stopping point.

The method is described again below, with reference to FIGS. 1 and 2. FIGS. 1 and 2 respectively show a view area, i.e., a detection range 4, of at least one environment detection sensor 1 in the environment detection sensing system of the vehicle 2. The environment detection sensing system includes, for example, one or more video, lidar, and/or radar systems. The environment detection sensor 1 to be checked using the method is therefore, for example, a video, lidar, or radar sensor.

Information is stored in the digital map as to which stationary objects 3 in the environment of the vehicle 2 can be detected with the respective sensing system, i.e., with the respective environment detection sensor 1 to be checked, looking outward from a specific current position of the vehicle 2. In the example provided, the detection range 4, also known as the view range or field of view, of the environment detection sensor 1, configured here as a video sensor or lidar sensor, for example, is shown. In the case shown in FIG. 1, this environment detection sensor 1 detects, as features, one side of the stationary object 3 designated as Building G and the respective contour of two stationary objects 3 designated as Bushes B, wherein their detection conforms to the corresponding expectations. Therefore, in the example according to FIG. 1, no degradation of the environment detection sensor 1 on the vehicle 2 checked by means of the method is deduced.

In the example according to FIG. 2, there is degradation of this environment detection sensor 1. Here also, the detection range 4, also known as the view range or field of view, of this environment detection sensor 1 to be checked is shown. This detection range 4 is impaired by an atmospheric disturbance 5, schematically represented as a cloud, i.e., there is atmospherically caused degradation of the environment detection sensor 1.

In this example, the environment detection sensor 1 does detect, as a feature, the sides of the stationary object 3 designated as Building G, but due to changed reflection caused by the atmospheric disturbance 5 and/or due to changed reflection conditions caused by the atmospheric disturbance 5, the stationary objects 3 stored in the digital map and designated as Bushes B, in particular their contours as their features, can no longer be perceived by the environment detection sensor 1 at a preset, specifically ideal, distance.

This can be proven In particular through comparison with the expected efficiency using historic and/or digital maps. In other words, the environment detection sensor 1 is expected to recognize the features of the stationary objects 3 stored in the digital map, and therefore the stationary objects 3, from the current position of the vehicle 2. However, this does not occur for the stationary objects 3 designated as Bushes B, so degradation of the environment detection sensor 1 is deduced.

LIST OF REFERENCE INDICATORS

1 Environment detection sensor
2 Vehicle
3 Stationary object
4 Detection range
5 Atmospheric disturbance
B Bush
G Building

The invention claimed is:

1. A method for checking at least one environment detection sensor on a vehicle, comprising:
    locating the vehicle on a digital map,
    identifying features of stored stationary objects in an environment around the vehicle on the digital map, and the environment detection sensor is adapted recognize the stored stationary objects based on those features,
    scanning the environment around the vehicle by the environment detection sensor,
    wherein it is deduced that the environment detection sensor has degraded if the features of the stored stationary objects whose recognition is expected are not recognized by the environment detection sensor or if features actually recognized by the environment detection sensor deviate from the features whose recognition is expected, and
    wherein degradation of the environment detection sensor is not deduced if it is determined that the features whose recognition is expected are not recognized by the environment detection sensor due to being concealed by at least one dynamic object, or the features actually recognized by the environment detection sensor deviate significantly from the features whose recognition is expected due to being concealed by at least one dynamic object.

2. The method of claim 1, wherein a deviation occurs when the deviation exceeds a preset tolerance range.

3. The method of claim 1, wherein degradation of the environment detection sensor is deduced if an expected distance between the vehicle and one of the stored stationary objects stored in the digital map varies from an actual detected distance between the vehicle and the stored stationary object by more than a preset distance threshold value, wherein the expected distance taken from the digital map is determined as the feature of the stored stationary object that is expected to be recognized and the actual detected distance is determined by the environment detection sensor.

4. The method of claim 1, wherein based on sensor data from the environment detection sensor, the detected stored stationary objects are classified to determine recognized classification types of the stored stationary objects as actual recognized features of the stored stationary objects, in that the recognized classification types are checked for agreement with expected classification types that are obtained from the digital map as features expected to be recognized, and in that degradation of the environment detection sensor is deduced if a determined classification rate is lower than a preset classification threshold.

5. The method of claim 1, wherein features of stored stationary objects in the environment around the vehicle, whose recognition by the environment detection sensor is expected, are identified in the digital map by means of sensor-specific detection information stored in the digital map.

6. The method of claim 1, wherein features of stored stationary objects in the environment around the vehicle, whose recognition by the environment detection sensor is expected, are identified in the digital map by means of a calculation of the expected recognizability, based on a three-dimensional model of the digital map.

7. The method of claim 6, wherein the expected recognizability is calculated using a ray tracing method.

* * * * *